July 17, 1973     L. R. GENSMAN ET AL     3,746,638
BATCH SEWAGE TREATMENT SYSTEM AND METHOD
Filed March 3, 1971     2 Sheets-Sheet 1
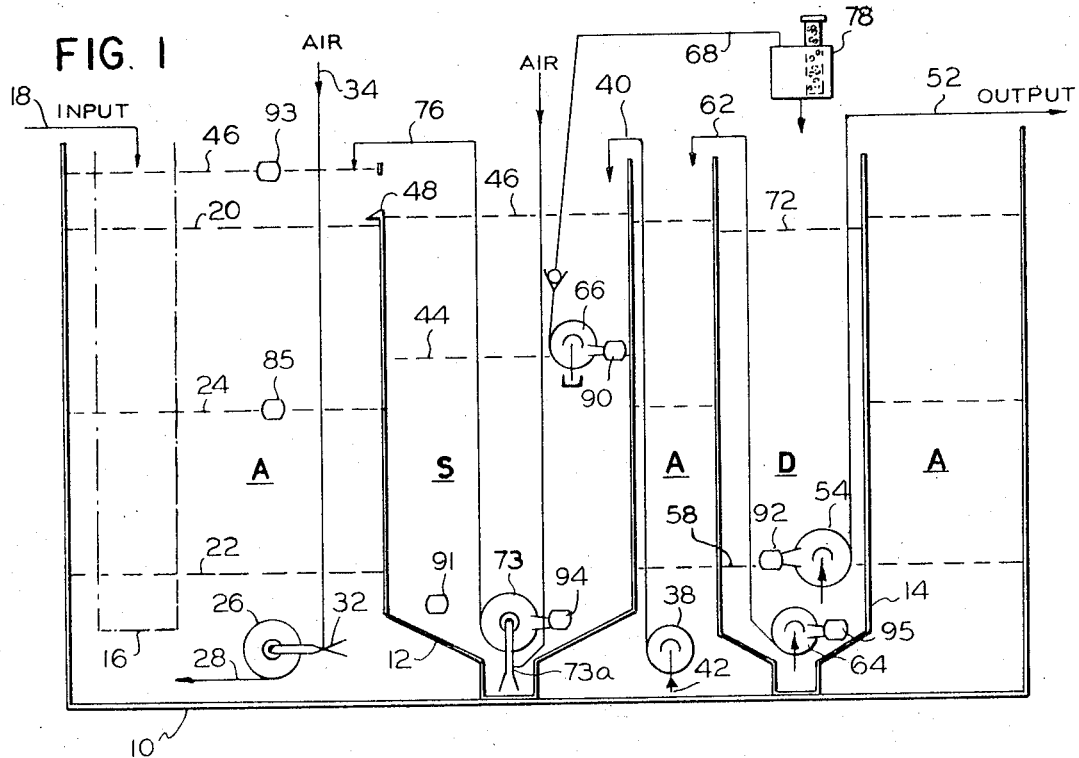
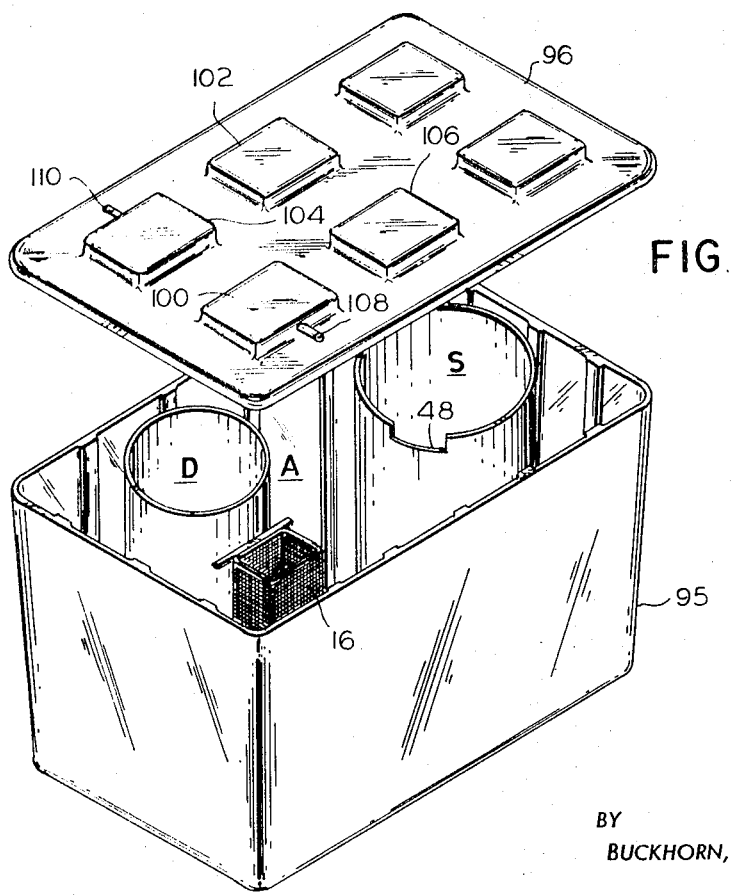
LEE R. GENSMAN
JACK R. NUNN
*INVENTORS.*
BY
BUCKHORN, BLORE, KLARQUIST & SPARKMAN
*ATTORNEYS*

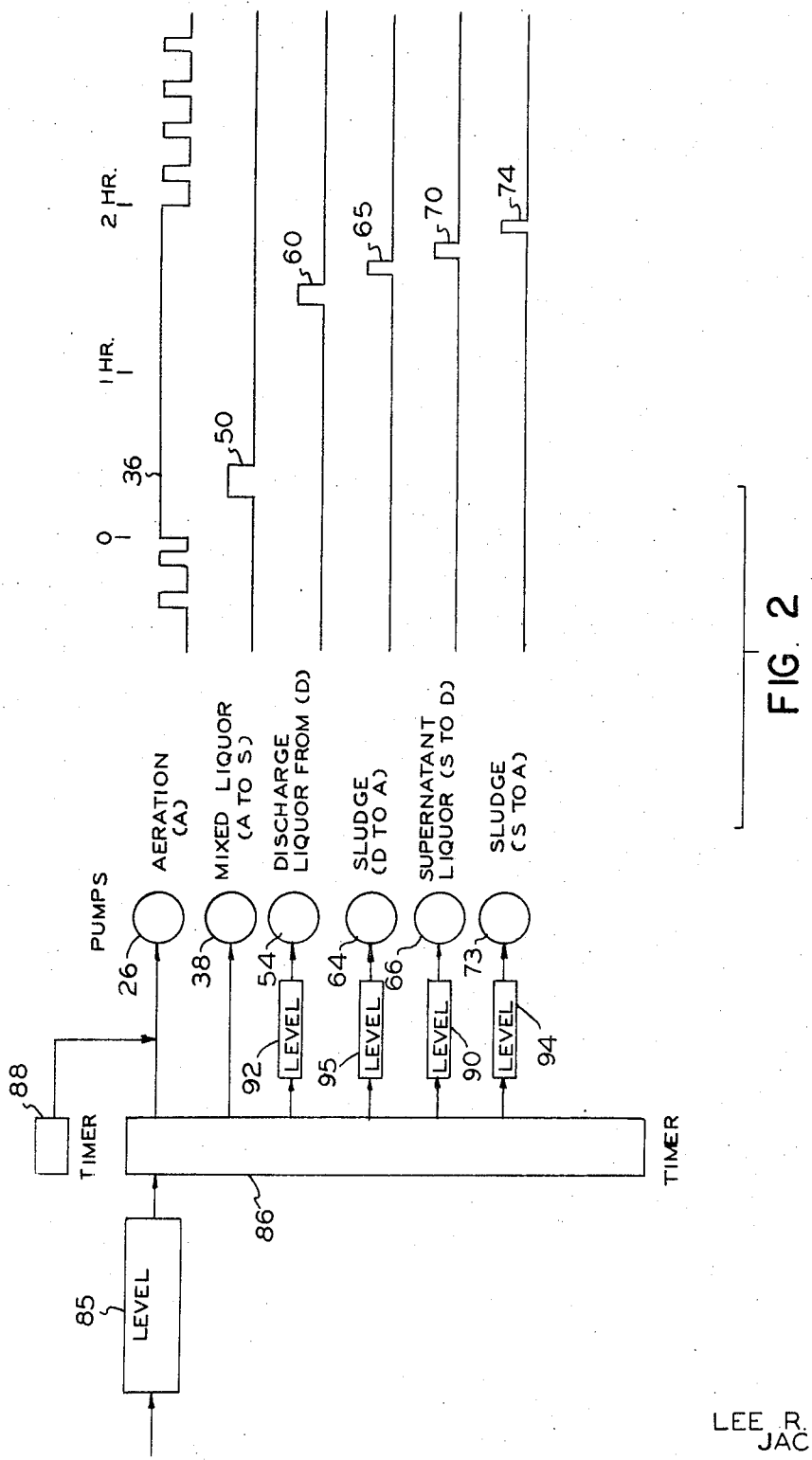

3,746,638
BATCH SEWAGE TREATMENT SYSTEM AND METHOD
Lee R. Gensman, Tualatin, and Jack R. Nunn, Portland, Oreg., assignors to Bio-Pure, Inc., Tualatin, Oreg.
Filed Mar. 3, 1971, Ser. No. 120,442
Int. Cl. C02c 1/06
U.S. Cl. 210—7    9 Claims

ABSTRACT OF THE DISCLOSURE

A sewage treating system and method particularly suitable for installations with highly variable flow provides automatic operation in which incoming sewage is mixed and aerated continuously (or intermittently under low flow conditions) and withdrawn in batches for clarification and discharge. A sewage receiving basket having open mesh side and bottom walls is partly submerged in premixed liquor (mixed aerated sewage) in an aeration chamber. Mixed liquor is mixed with air utilizing venturi aspirated atmosphere into a pump suction and circulated in this chamber. A portion of the aerated mixed liquor is circulated through the basket to cause aerobic digesting and hydraulic erosion such that there is a reduction in size of the solid organic material in the basket to particles which will pass through openings in the walls of the basket and intermix with pre-existing mixed liquor. Batches of mixed liquor are intermittently pumped from this chamber into a settling chamber in excess of the amount filling the settling chamber. The excess is discharged back into the aeration chamber over a weir and acts to skim floating sludge back into the aeration chamber. The resulting batch thus withdrawn from the aeration chamber is settled in the settling chamber under quiescent conditions; a part of this settled batch, specifically supernatant liquor taken from below the top scum layer, is then delivered to a discharge chamber where it is further settled and the resulting supernatant liquor discharged. Settled sludge and floating scum from the settling and discharge chambers are returned to the aeration chamber by pumps which completely empty these chambers.

BACKGROUND OF THE INVENTION

Being most effective in the steady state condition, biological sewage treatment processes for treating the sewage from small installations, for example, those suitable for a community of a minimum of 2 to 4 residences, or a motel, vacation resort, apartment house, ship, or a manufacturing plant, and the like, present difficulties caused primarily by the uneven load conditions to which the treating plant is subjected. The most effective treatment employs digestion by aerobic bacteria which function naturally when supplied with air and food in the form of sewage. To treat effectively air must be introduced into the sewage and the sewage must be intimately mixed with air or oxygen and returned settled sludge. The resulting mixture is known as mixed liquor. Such mixed liquor is most effective when it is a mixture of air, solid particles suspended in water including particles of incoming sewage, and activated sludge containing aerobic bacteria obtained by settling and re-aerating previously aerated partially digested mixed liquor. Most of the organic material is oxidized by the bacterial digestion to produce water and nonodorous and nonexplosive gases which are discharged from the system. An effective system produces an aqueous effluent very low in solid organic material and having a low biochemical oxygen demand or B.O.D. Dissolved oxygen in the effluent should be as high as possible.

Most previously proposed systems attempt to operate in a continuous schedule where the rate of flow through the various stages of the system depends primarily upon the rate of input of the raw sewage and the final discharge effluent overflows from a clarifier at the same rate as the input. In relatively small systems, however, the input of raw sewage is usually so variable that a considerable portion of the sewage is not adequately treated or clarified since clarification is a function of the rate of flow. When the input of sewage is low or nonexistent for a considerable period of time, the aerobic bacteria in the system diminish in amount because of lack of food and the input of sewage may resume in such high volume that insufficient time of treatment is provided to enable the bacteria to increase to the amount necessary for adequate treatment of the sewage.

Substantially the same thing occurs in previously suggested batch systems in which incoming raw sewage is stored until enough is accumulated to provide a predetermined batch for which the system is designed. At this time the entire batch is processed through the system. Again during periods of low input of raw sewage the bacteria in the system decrease until one or more batches are inadequately treated when the input suddenly increases. These prior batch systems have been unduly complicated in structure and operation and, in general, have required frequent manual adjustments and repairs.

SUMMARY

The system and method of the present invention overcomes the limitations discussed above for relatively small systems, i.e. systems having inputs as low as approximately 600 gallons per day and has the ability to handle large short time flows. This is accomplished by providing an aeration chamber in which a volume of mixed liquor is maintained which is several times the size of the batches withdrawn from such chamber for ultimate discharge and also providing a sewage receiving and digestive reducer basket in the aeration chamber which is partly suberged in the mixed liquor in this chamber. The basket has foraminous walls which retain solid organic material of a size which will not pass through the openings in the walls of the basket. These openings, however, allow free circulation throughout the basket of an intimate mixture of air and mixed liquor from the body of liquor in the aeration chamber.

A part of the mixture of air and mixed liquor is preferably directed into the lowest portions of such basket and passes upwardly through the basket to agitate and contact the solid materials therein. The total mixture flow is directed so as to also produce a general circulation in the aeration chamber. This aeration and mixing action is carried on to a reduced extent even when the input of sewage is low or absent. Substantially all of the organic solids in the basket are reduced by digestion and hydraulic trituration to particle sizes which will pass through the openings in the basket, so that the provision of the basket renders unnecessary the use of comminuting or grinding equipment usually employed as a first step of raw sewage treatment. The small particles that do pass through the basket are more readily and rapidly attacked by the bacteria due to the higher surface area and reduced core volume of these particles. The relatively large amount of mixed liquor retained at all times in the aeration chamber and containing food for the bacteria and the presence of organic material in storage, as it were, in the basket, and which becomes gradually available as bacteria food during times of low input of raw sewage, results in retaining a supply of viable aerobic bacteria for much greater lengths of time during periods of low input than in prior systems.

The remainder of the system and method provides two stage settling or clarifying of batches of mixed liquor, first in a settling chamber and then in a discharge chamber with or without the addition of chlorine in the discharge chamber. Where chlorination is employed, the available time of contact with chlorine in the discharge chamber is substantially longer than that usually available in other waste treatment equipment. Complete mixing of chlorine and supernatant is effected as the empty discharge chamber is filled, and the maximum possible reaction of the chlorine with harmful organisms is insured by quiescent holding of this mixture for an adjustable period of time. A relatively large volume of liquor is normally detained in the settling chamber for a standard period of time to allow quiescent settling to proceed and so that a batch of clear supernatant liquor, substantially smaller in volume than that detained in this chamber, can be withdrawn from an intermediate level of such liquor for final settling in the discharge chamber so that the amount of suspended solids and B.O.D. in the final discharge is very low. Also, the amount of mixed liquor delivered into the first settling chamber is somewhat greater than the amount of this liquor which can be detained in the settling chamber. The mixed liquor excess flows back to the aeration chamber over a weir to skim any floating sludge in the settling chamber from the liquor therein and return it to the aeration chamber.

After completion of withdrawal of supernatant, settled sludge in both the settling chamber and the discharge chamber is aerated and completely returned to the aeration chamber to reinoculate the mixed liquor in the aeration chamber with active bacteria and for further aeration treatment of the returned sludge.

The complete emptying of the two settling chambers at the completion of the sludge return operation provides complete elimination of solids buildup in either of these chambers, heretofore a common problem in waste treatment equipment. Furthermore, the repeated recirculation of sludge effects nearly complete digestion so that the undigestible solid waste which finally remains in the aeration chamber is small in volume so that the system requires infrequent disposal of such waste.

The system and method can be automatically operated by a simple and reliable control system involving standard multiple timer units and a minimum of controls actuated by liquid levels. A plurality of pumps controlled by the timer and level controls provide a system which may be completely free of valves of any kind. Preferably the pumps for the materials being treated, particularly those in the aeration and settling chambers, are standard submerged electrically driven sewage pumps so that heat resulting from energy losses in the pump motors is utilized to heat the materials being treated to increase the bacterial activity. This becomes of greater importance in extremely cold weather.

Although the system and method of the present invention is particularly useful for small installations, much larger installations than those indicated above are entirely producible and also a plurality of such systems can be installed to operate in parallel.

It is, therefore, an object of the invention to provide an improved sewage treatment system and method which can be utilized for relatively small installations but which can be built in larger sizes for larger throughput or a plurality of small systems can be operated in parallel.

BRIEF DESCRIPTION OF DRAWINGS

FIG. 1 is a diagrammatic view of a preferred embodiment of the invention;

FIG. 2 is a diagrammatic view of suitable control mechanism for the system of FIG. 1 including a timing chart showing a suitable operation schedule;

FIG. 3 is an isometric view of a unitary tank structure in which the entire system of FIGS. 1 and 2 can be housed.

DESCRIPTION OF THE PREFERRED EMBODIMENT

The sewage treatment system shown in FIG. 1 includes an aeration tank 10 providing an aeration chamber designated A, a settling tank 12 providing a settling chamber designated S and a discharge tank 14 providing a discharge chamber designated D in which further settling also occurs.

The aeration chamber A contains, at one end, a receiving basket 16 for raw sewage from an input conduit 18. This basket has foraminous side and bottom walls; for example, it can be a rectangular basket approximately square in horizontal cross section made from ¼ inch mesh metal hardware cloth secured to suitable frame members at the edges of each of such walls. This basket has an interior volume which is a small fraction of the volume of the aeration tank 10, for example, .01 to .10 of the volume of the aeration tank and has its bottom wall and at least certain of its side walls spaced from the corresponding walls of the tank. The size of the openings in the foraminous walls of the basket may, for example, range from approximately ⅛ to ½ inch in their smallest dimension and may be in the form of round, rectangular, or other shaped holes including elongated slots.

The liquid levels which may be present in the aeration chamber A during normal operation of the system are indicated by the dash lines 20, 22, and 24. The line 20 indicates approximately the highest level which occurs under conditions of normal input of sewage and the line 22 indicates the lowest level which will be produced by removing a batch of mixed liquor from the aeration chamber A for settling in chamber S.

The intermediate dotted line 24 indicates the approximate level at which a cycle of continuous aeration and batch clarification is started due to an increase of liquid level in aeration chamber A. Since no liquor is removed from chamber A during a batch clarifying cycle after the liquid level has once been reduced to the level indicated by the line 22, it is possible that an unusually heavy input of sewage through the conduit 18 may raise the level to approximately the line 20 before the end of a cycle and the start of a new cycle.

The lower portion of the receiving basket 16 remains submerged in the mixed liquor in the aeration chamber A at all times. A circulation and aeration pump 26 which may be a standard centrifugal sewage pump submerged in the mixed liquor in the aeration chamber discharges an intimate mixture of air and mixed liquor through a conduit 28 into the liquor beneath the basket 16. The liquor for this mixture is withdrawn through a venturi 32 from the mixed liquor in aeration chamber A. The venturi 32 in the pump suction introduces a stream of air or oxygen from a conduit 34 into the stream of liquor in the venturi 32. This air or oxygen is thoroughly mixed under some pressure with the liquor by the pump impeller, increasing the solubility of the gas in the liquid. The result is relatively rapid flow of a mixture of air and mixed liquor upwardly through the bottom of the basket 16 and outwardly through the sides of the basket and the establishment of a general circulation in the chamber A which maintains sludge solids in the chamber in suspension in the liquor. During periods of low flow of incoming sewage the continuous aeration and mixing referred to above is suspended and the pump 26 is driven intermittently, for example, 5 minutes in every 15 minutes, in order to maintain some activity of the aerobic bacteria without excessive consumption of the limited food incoming with raw sewage. This is the condition illustrated by the end portions of the line 36 of the timing chart of FIG. 2 in which the upper level of this line indicates operation of the aeration pump 26.

The walls of the basket 16 retain any pieces of material of substantial size in the basket and prevent these pieces from reaching other portions of the system. Such permits use of pumps to transfer and circulate liquids throughout the system without danger of clogging the same, which has not heretofore been possible. The repeated circulation of a mixture of air and mixed liquor containing the active bacteria, however, subjects such pieces of material to repeated tumbling and agitation and to the digestive action of the bacteria. The result is that the organic pieces disintegrate into particles which pass through the openings in the walls of the basket. Being small, these particles remain suspended in the circulated mixed liquor in the aeration chamber A and act as food for the active bacteria. Although certain undigestable solids will undoubtedly be received in the basket, the usual buildup of undigestible solids is so slight that the basket need be emptied only infrequently, annually, for example.

For purposes of explation it can be assumed that a sewage treating cycle has ended and the liquid level in the aeration chamber is between the dash lines 22 and 24 of FIG. 1. Thus the mixed liquor in this chamber is being intermittently aerated as controlled by timer 88 of FIG. 2.

When sufficient raw sewage enters the aeration chamber A from the input conduit 18 to raise the liquid level to the dash line 24, a treating cycle is initiated. This starts continuous aeration and mixing in the aeration chamber at zero time on the time scale of the chart of FIG. 2, as shown by the line 36.

After a period of such aeration and mixing, a mixed liquor transfer pump 38 is started to transfer mixed liquor to the empty settling chamber S through a conduit 40. The mixed liquor is withdrawn through a conduit 42 from the well mixed volume of chamber A and is discharged into the settling chamber S above the liquid level therein. The increase and subsequent rapid release of pressure during passage through the pump 38 liberates gas or air bubbles from the sludge particles so that most of the sludge particles rapidly settle in the chamber S. This settling is more rapid than in conventional treatment where no pump is employed, and enables the withdrawal of clear supernatant relatively soon after commencement of settling and before the settled sludge bulks sufficiently to start rising again to the surface.

There is, however, usually some floating sludge or particles on the surface of the liquid in the settling chamber S. It is desirable to return this floating material to the aeration chamber A and for this purpose approximately 5 percent more mixed liquor is delivered by the pump 38 into the chamber S than is necessary to fill this chamber to the level indicated by the dash line 46. The excess of mixed liquor thus pumped flows over a weir 48 back into the aeration chamber A to carry any floating material in the settling chamber S back into the aeration chamber for further aeration and bacterial treatment. This also maintains the liquid level in the chamber A not lower than that indicated by the dash line 22.

The time during which the pump 38 is operated is indicated by the upper portion of the line 50 of the chart of FIG. 2. The batch of mixed liquor thus transferred is a substantial part, for example, about one-third the amount of mixed liquor present in the aeration chamber at the start of the transfer.

The completion of this transfer into and overflow of the weir from settling chamber S is indicated by the end of the upper portion of the line 50 of the chart of FIG. 2. No further agitation of the liquor in settling chamber S occurs until completion of the settling portion of the cycle as indicated by the start of the upper portion of the line 70 of the chart of FIG. 2. Thus almost absolutely quiescent settling is allowed to take place, and any floating material is allowed to rise to the surface of chamber S.

Since the preceding discharge a batch of supernatant liquid from the settling tank has been settling in the presence of chlorine (if employed) in the discharge chamber D. Any sludge in the liquor in the chamber D settles cleanly from this liquor with little floating material present. Near the end of the settling period of the mixed liquor in chamber S, the timer on FIG. 2 energizes a pump 54 as indicated by the upper portion of the line 60 on FIG. 2, and the effluent in chamber D is discharged from the process through a conduit 52 via discharge pump 54. The discharge pump 54 is shut off by a level switch mounted in the lower portion of the tank D at such a level as to leave a small amount of liquid containing settled solids in the sump at the bottom of the tank D.

The timer shown on FIG. 2 then successively energizes the sludge pump 64 on FIG. 2 as indicated by the upper portion of the line 65 and discharges any settled sludge in the chamber D through the conduits 62 into the chamber A, thus effectively emptying the discharge chamber D of any liquid including solids which may have settled during the settling and chlorine contact process. If desired the conduit 62 may be redirected to discharge settled sludge to any external storage or disposal means.

The timer on FIG. 2 then successively energizes the supernatant transfer pump 66 in the chamber S as indicated by the upper portion of the line 70. The supernatant transfer pump removes the clear supernatant from the upper portion of the settling chamber S. This pump is shut off by a level switch activated by the liquid in the vessel which stops the operation of the pump before the surface of the level of the liquid in the chamber S has reached the pump suction. This effectively leaves within the chamber S any floating solids which may have risen to the surface during the settling process. The volume of supernatant fluid from the settling chamber S, for example, is about one-third of the liquid in the chamber S. Its withdrawal through the conduit 68 is accompanied by the introduction of chlorine in either dissolving tablets, liquid hypochlorites, or gaseous chlorine form. When the operation of the supernatant transfer pump 66 stops the injection of chlorine by whatever means is stopped. The resulting quantity of chlorine mixed with this supernatant discharge is completely controllable, and excess chlorine is not delivered when the supernatant transfer pump 66 is not in operation. This transfer of supernatant from the settling chamber S lowers the level in this chamber to the line 44 and raises the liquid level in the discharge chamber D to that indicated by the dash line 72.

After completion of transfer of supernatant from the settling chamber S to the discharge chamber D, all of the sludge which has settled in the settling chamber S and all of the floating material plus the remainder of the supernatant liquid which was not transferred by the previous operation is returned to the aeration chamber A by the pump 73, thus completely emptying chamber S. This effectively prevents the development of anaerobic sludge, as chamber S remains empty until the transfer of the next batch of mixed liquor from chamber A. Pump 73 is turned on successively by the timer on FIG. 2 as indicated by the upper portion of the line 74 of FIG. 2. As this sludge is pumped, venturi 73a in the suction of the pump 73 induces air into the sludge and the consequent mixing of air with the sludge reactivates the sludge. It is then discharged through the conduit 76 into the aeration chamber A where, via its discharge, it becomes intimately mixed with the mixed liquor already present in the chamber A. The continuous aeration and recirculation action of the pump 26 in the chamber A is going on during the entire portion of this sludge return operation thus enabling any raw sewage which has been introduced into the chamber A to become rapidly mixed with and attacked by the bacteria present in the chamber A.

If the level of sewage in the chamber A is below the line 24 following the completion of the sludge return indicated by the upper portion of the line 74 on FIG. 2, the cycle timer shown on FIG. 2 ceases to operate and the plant goes into a reduced period of operation pending the receipt of further sewage to raise the level in the chamber A up to a point above the line 24. During this period of reduced treatment the timer 88 on FIG. 2 controls the intermittent operation of the aeration and mixing pump 26 as indicated by the right-hand portion of the line 36 on FIG. 2, and this intermittent operation continues until such time as incoming sewage raises the level in the chamber A to approximately that indicated by the dash line 24 on FIG. 1.

It is an important feature of the controls embodied in this system that the amount of aeration can be automatically limited if demand for sewage treatment is low; and, furthermore, during the lifetime of the plant the changes in nature and quantity of the sludge volume in the chamber A can be reflected by an adjustment of the amount of aeration and mixing occurring during these low flow periods.

If desired, an addition of chlorine or flocculating agents in conventional amounts can be made to the settling effluent in the discharge chamber D during each supernatant transfer. This can be accomplished by providing a tank 78 connected to the conduit 68 together with suitable dispensing means. Introduction of these materials as the chamber D is being filled provides for maximum effectiveness of mixing.

A simple control system is also diagrammatically illustrated in FIG. 2 which includes a level control 85 responsive to the liquid level in the chamber A for starting a timer 86 for controlling the various pumps. It also includes a second timer 88 for controlling the intermittent operation of the aeration and circulation pump 26 in the aeration chamber A between batch treating cycles. The control system also includes level control 90 responsive to the liquid level in settling chamber S for stopping the pump 66 before floating solids are removed, and to regulate the volume pumped into discharge chamber D.

Level control 91 in chamber S maintains operations of timer 86 and aeration pump 26 during settling period of the cycle, not withstanding that the level in chamber A may have been reduced below line 24 of FIG. 1 during transfer of mixed liquor into chamber S. Level control 92 in chamber D stops discharge pump 54 before the surface of liquid in chamber S reaches the pump suction thus preventing discharge of floating solids. A further level control 93 located in aeration chamber A at a position corresponding to excess input indicated by the dash line 46 can provide an alarm signal of any suitable type and can also be utilized to accelerate the settling portion of the cycle so as to increase the frequency of discharge with the least possible sacrifice of treatment quality. This level control 93 thus operates timer 94 to reduce the normal timed duration of the settling period by, for example, 40 percent. This increases the discharge rate of the system, for example, to 143 percent of normal, and would make desirable the substitution of oxygen for air in conduit 34.

During non-accelerated or normal cycles, the timer 88 starts and stops the pump 26 intermittently between batch sewage treating cycles as described above and as indicated by the end portions of the line 36 of the chart of FIG. 2. whenever the liquid level in the aeration chamber A is at least equal to the level indicated by the line 24 of FIG. 1, a timing operation of the timer 86 is initiated. This timing operation is sustained by level control 91 in settling chamber S, if the level in the aeration chamber A falls below line 24 during operation of mixed liquor transfer pump 38 and consequent filling of settling chamber S. This timer overrides the timer 88 to keep the aeration and the circulation pump 26 in continuous operation during a batch sewage treating cycle which is indicated by the middle portion of the line 36 of the chart of FIG. 2 and the other lines of this chart.

The volume of sewage treated in each batch is actually measured by the volume of effluent discharged from the discharge tank by the pump 54. This in turn is determined by the volume of supernatant liquid pumped out of the settling chamber S into the discharge chamber D, which is empty at the time the pump 66 is started, less the amount of liquid and sludge returned by the pump 64 from the discharge chamber D to the aeration chamber A. This is the volume of liquid between the liquid levels in the chamber D indicated by the dash lines 58 and 72. The level control 90 indicated in FIG. 2 is therefore advantageously employed to stop the pump 66 when the liquid in the chamber S reaches the desired lower level indicated by the dash line 44. The pump 54 is later effective to later discharge the supernatant in the discharge chamber D down to the level indicated by the dash line 58, and the level control 92 stops this pump when the proper level is reached. The sludge pump 73 is stopped by the level switch 94 when the level of sludge in the settling chamber S reaches this switch 94. The time of operation of the liquid and sludge pumps 38 and 64, as well as the aeration pump 26, may, however, be controlled by the timers 86 and 88 with sufficient accuracy.

Standard centrifugal sewage pumps each having an associated electric motor in a watertight casing so as to be submersible are available. Such pumps can be obtained with built in liquid level controls responsive to the pressure head of liquid on the pumps so that no exposed mechanical or other level controls are required, although such controls can be employed if desired. Thus, the pumps 73 and 66 may, for example, be equipped with such built in level controls for stopping the pumps 73 and 66 at a preselected level.

The employment of a separate pump for each liquid or sludge transfer or aeration operation has a number of advantages. In the system shown, there is a complete absence of valves which must be operated during sewage treating operation, thus eliminating maintenance problems caused by plugging with solids. failure of valve actuators, valve seats, etc.

The use of individual submersible pumps suspended from the tops of the various aeration, settling and discharge chambers and powered through flexible cords makes it possible to unitize each pump and associated piping. An individual unit can thus be withdrawn for servicing or replacement without by-passing the sewage or emptying the tanks. Also there is no pumping of clear supernatant liquid through lines or pumps which are alternatively employed for pumping mixed liquor or sludge with resultant chance of contamination of clear liquids with solid particles, and resultant discharge of increased amounts of suspended solids from the system. Furthermore, the required control system and plumbing is much simpler than is the case where a plurality of valves are employed to alternatively direct a plurality of liquid materials through a single pump, although, of course, it is possible to provide the required plumbing and valves to carry out the sewage treating operations of the present invention with a lesser number of pumps.

As a specific example of a relatively small installation, a system in accordance with the present invention may be provided for treating approximately 5000 gallons of raw sewage per day. A single lightweight unitary tank structure 95, which may, for example, be of fiberglass construction having single walls or double walls filled with a cellular material for stiffness, and provided with a cover 96 of the same material can be employed to house the entire system. This tank may be divided by suitable partitions into the aeration chamber A. the settling chamber S, and the discharge chamber D, or separate internal vessels of any desired shape may be employed, for example, the cylindrical tanks as shown in FIG. 3. Under conditions peculiar to some installations, such as ships, three separate tanks remotely located can be utilized without regard to gravity. The receiving basket 16 is shown in position in the aeration chamber A and the weir 48 in the settling chamber S is shown in position to discharge into the aeration chamber A, including skimmed sludge, which overflows from the settling chamber S over the weir 48.

The cover 96, when installed, is securely fastened to the tank 95 and is provided with a plurality of openings surrounded by upstanding walls and provided with removable lids 100, 102, 104, and 106 for inspection and clean out purposes. The opening covered by the lid 100 is positioned over the basket 16 to allow removal and cleaning of this basket while the timers 86 and 88 are housed under the cover 102. The various pipes for transferring materials are not shown, although a sleeve 108 providing an entrance for the inlet conduit 18 of FIG. 1 is shown as is a similar sleeve 110 for the discharge conduit 52. The basket 16 can be suspended from the cover by bolts. By placing gaskets on the lids and providing a suitable vent connection, the tank 95 can be installed in an enclosed area such as a ship or building. Locks on the lids can provide protection against tampering so that fencing is not needed.

For a typical 5000 gallon per day system the volumes of material contained in the chambers A, S, and D when filled to the levels 20, 46, and 72 may be, for example, 3200, 1100, and 400 gallons, respectively, or a total of 4700 gallons. The aeration chamber A when filled to normal level 24 may have a further capacity of at least 1830 gallons, i.e., may be filled to the level 20 to take care of unusually large input of raw sewage during a batch treating cycle, when no mixed liquor can be withdrawn from the aeration chamber A. A further excess input of about 200 gallons with no mixed liquor being withdrawn will reach level 46 and activate the alarm and the accelerated settling cycle.

The settling chamber S may have a volume of 1100 gallons when filled up to the level 46 which provides a volume of 375 gallons between the levels 46 and 44. When mixed liquor is transferred during a batch treating cycle from the aeration chamber A to the settling chamber S by the pump 38, this amount of 1100 gallons only is actually retained in the settling chamber S even though approximately 1300 gallons may be delivered into the settling chamber S by the pump 38.

Near the end of the settling period in the chamber S, 350 gallons of settled effluent are discharged from the discharge chamber D by the pump 54 to reduce the material therein to the level 58, and then a remaining volume of 25 gallons of sludge containing liquid is withdrawn from a sump in the bottom of the chamber D and returned to the aeration chamber A by the pump 64. This material is mixed with the mixed liquor by the circulation caused by the continuous aeration in this chamber A during a batch treating cycle.

The above operation empties the discharge chamber D and this chamber is then refilled up to the level 72 with 375 gallons of supernatant liquor from an intermediate height in the liquid in the settling chamber S by the pump 66. The optimum time for withdrawal of this supernatant is adjusted to suit the settling characteristics of the sewage. This liquid is allowed to settle in the discharge tank D until near the end of the next batch treating cycle.

The pump 73 then withdraws 725 gallons of liquid containing settled sludge from a sump in the bottom of the settling chamber S, mixes it with air, and discharges it into the aeration chamber A where it is mixed with the mixed liquor therein. This empties the liquid from the settling chamber S, the batch treating cycle is ended, and the aeration in the chamber A is returned to intermittent operation, unless the level in this chamber is at or above the level 24 as a result of a heavy input of raw sewage in which case another batch treating cycle immediately starts.

The lowest level of mixed liquor which can be reached in the aeration chamber A is that indicated by the line 22 representing a volume in such chamber of 650 gallons, which is the minimum of 1750 gallons required to start a batch clarifying cycle less the 1100 gallons thereafter withdrawn by the pump 38. At the end of a batch clarifying operation, 750 gallons of aerated liquid material containing activated sludge suspended therein has been returned from the settling chamber S and the discharge chamber D to the aeration chamber A for reinoculation of the mixed liquor in the aeration chamber A. If no raw sewage has been received during such batch treating cycle, a minimum volume of 1400 gallons is in the aeration chamber A at the end of the batch treating cycle. This amount of mixed liquor will contain sufficient food to retain an active amount of aerobic bacteria for a considerable length of time under the conditions of intermittent aeration described above. Also, there will usually be at least some solid organic material in the receiving basket 16 which disintegrates to gradually release more of such food. Even if the aerobic bacteria markedly decreases due to lack of food during an extended period of low input of raw sewage, the settling of sludge in two different settling operations which take place sequentially in the settling chamber S and discharge chamber D followed by the return of the settled sludge to the aeration chamber A provides time for the bacteria in the aeration chamber A to again become active when input of raw sewage resumes. The result is that substantial amounts of sludge solids are not discharged from the system with the effluent from the discharge chamber D.

The system of the specific example above described has been found adequate to treat approximately 5000 gallons of raw sewage per day even though the input of raw sewage varies considerably over a 24-hour period. Larger or smaller systems can be provided by proportionally varying the size of the treating chambers and receiving basket with a proportional increase in pumping capacity by employing larger pumps or a plurality of pumps operating in parallel.

The amount of suspended solids in the effluent from the discharge chamber D of the system above described is very low, the second settling operation in the discharge chamber D reducing the suspended solid content to a range of 6 to 30 p.p.m. with the result that the biochemical oxygen demand is also very low and of the order of 10 to 20 p.p.m. with a dissolved oxygen content of the order of $3/10$ p.p.m.

We claim:

1. An activated sludge sewage treating method which comprises:
   introducing incoming raw sewage into an aeration chamber at least partly filled with a body of mixed liquor;
   aerating said body of mixed liquor in said aeration chamber by causing a stream of a mixture of air and said mixed liquor to pass upwardly therethrough to cause physical and biological disintegration of solid organic material therein and further to cause circulation of mixed liquor in said chamber;
   intermittently withdrawing batches of such aerated mixed liquor from said chamber, leaving in said chamber a volume of mixed liquor sufficient to maintain biological activity;
   settling each of said batches and discharging effluent; and
   returning sludge settled in said batches to said aeration chamber,
   said withdrawing of batches of aerated mixed liquor from said chamber including pumping from said aeration chamber into a settling chamber a volume of mixed liquor substantially greater than the volume of said settling chamber and discharging back into said aeration chamber over a weir the excess of said pumped mixed liquor, thereby to carry floating material in said settling chamber back into said aeration chamber,
   said settling of said batches including
   settling of the mixed liquor remaining in said settling chamber,
   withdrawing a batch of the supernatant liquor from an intermediate level of said settling chamber,
   discharging the same into a discharge chamber, and settling the batch of supernatant liquid in said discharge chamber, effluent being discharged from said discharge chamber, and the settled sludge from both said settling chamber and said discharge chamber being returned to said aeration chamber.

2. A method in accordance with claim 1 in which said supernatant liquid is transferred from said settling chamber into said discharge chamber until the liquid in said settling chamber reaches a predetermined level so selected to leave floating material remaining in said settling chamber.

3. A method in accordance with claim 2 in which said settling chamber is completely emptied after said supernatant liquid is pumped therefrom.

4. A method in accordance with claim 1 in which said effluent is discharged from said discharge chamber until the liquid in said discharge chamber reaches a predetermined level so selected to leave floating material remaining in said discharge chamber .

5. A method in accordance with claim 4 in which said discharge chamber is completely emptied after said effluent is discharged.

6. An activated sludge sewage treating system comprising:
an aeration tank for containing a body of mixed liquor;
level control means for maintaining the body of mixed liquor in said tank at a level at least partly filling said tank;
circulation means for causing a stream of said mixed liquor admixed with air to pass through said tank thereby causing disintegration of solid organic material therein and circulation of mixed liquor in said tank;
withdrawal means actuated by said level control means for intermittently withdrawing batches of mixed liquor from said tank and leaving in said tank a volume of mixed liquor sufficient to maintain biological activity;
settling means for settling each of said batches; and
transfer means for discharging effluent from said settling means and returning settled sludge from said settling means to said aeration tank,
said settling means including:
a settling tank for receiving said batches from said aeration tank, said settling tank having a volume less than the batches received from said aeration tank and having a weir at its top for discharging excess liquid back into said aeration tank;

first pump means for pumping a portion of the supernatant liquid from said settling tank after a settling period in said tank, said first pump means withdrawing said supernatant liquid from an intermediate level in the liquid in said tank and delivering the withdrawn liquid into a discharge tank for further settling;

said withdrawal means including second pump means for pumping a volume of mixed liquor from said aeration tank into said settling tank which volume is substantially greater than the volume of said settling tank to cause excess mixed liquor to flow over said weir into said aeration tank and carry floating material in said settling tank back into said aeration tank;

said system further including third pump means for discharging effluent from said discharge tank and fourth pump means for returning settled sludge from both said settling tank and said discharge tank back to said aeration tank.

7. The system of claim 6 in which said pump means comprise submersible pumps disposed within the respective tanks.

8. The system in accordance with claim 7 in which at least the pumps in said aeration tank and said settling tank are driven by electric motors which are submerged in the liquids in said tanks to add heat produced by electrical losses in said motors to the liquids undergoing treatment by aerobic bacteria.

9. A system in accordance with claim 6 further comprising a separate pump for each transfer of liquid or sludge in said process from one of said tanks to another or to discharge, whereby no valves are required for liquid transfer in said system.

References Cited
UNITED STATES PATENTS

| | | | |
|---|---|---|---|
| 3,607,737 | 9/1971 | Gamer | 210—15 X |
| 3,560,376 | 2/1971 | Heil | 210—7 |
| 3,524,547 | 8/1970 | Nicol | 210—195 X |
| 2,852,140 | 9/1958 | MacLaren | 210—221 |
| 3,546,110 | 12/1970 | Englesson | 210—221 |
| 3,535,234 | 10/1970 | Gilwood | 210—195 X |
| 3,679,053 | 7/1972 | Koulovatos et al. | 210—220 X |
| 3,220,706 | 11/1965 | Valdespino | 210—14 X |

MICHAEL ROGERS, Primary Examiner

U.S. Cl. X.R.

210—13, 14, 104, 141 195, 221